Patented Apr. 25, 1950

2,505,374

UNITED STATES PATENT OFFICE 2,505,374

EXTRACTION OF PENICILLIN

Arthur Frank Wirtel, Glendale, and Charles M. Blair, Jr., Webster Groves, Mo., assignors to Petrolite Corporation, Ltd., Wilmington, Del., a corporation of Delaware No Drawing. Application May 25, 1945,
Serial No. 595,874

3 Claims. (Cl. 260—302)

This invention relates to improvements in the separation of antibiotics, and particularly penicillin, from impure aqueous solutions.

In the production of penicillin by either the vat or bottle culture methods, the mold is grown in a suitable nutrient broth for the necessary length of time, the broth is then filtered to separate the cells, and the resulting penicillin solution treated to extract penicillin therefrom. In dry culture procedures the mold is grown on a solid or dry nutrient medium, and the penicillin is extracted from it by water, giving an impure, dilute penicillin solution. One common method of separating the penicillin from the culture broth is to acidify it to convert the penicillin to the acid form, and then extract the esterified solution with a water-immiscible solvent, such as amyl acetate, isopropyl acetate or chloroform. Amyl acetate appears to be the solvent of choice. The extraction is carried out by vigorously agitating the broth with the solvent, and then separating the two by appropriate stratification. The admixture of the solvent with the broth results in extremely persistent emulsions, which do not readily separate into an aqueous layer and a solvent layer. Separation by gravity is impractical and centrifugal separation is extremely difficult, if, in many cases, feasible at all.

The present invention provides improvements in this extraction operation which permit the quick and complete separation of the emulsion which is formed upon agitation of the impure penicillin solution with the organic solvent, in most cases without requiring the use of centrifuges, and where in the interests of rapid separation, centrifuges are used, greatly simplifying the operation and increasing its efficiency.

In accordance with the present invention there is incorporated in the impure penicillin solution, either before acidification or after, and either before or after the solution is admixed with the organic solvent, advantageously before, an acylated amino-ether. After the addition of this material, the emulsion which forms upon agitating the solvent with the acidified penicillin solution, separates rapidly and quite completely into two layers, a solvent layer containing the penicillin, and an aqueous layer which may be discarded. The amount of acylated amino-ether which is used will ordinarily be in the range of one part to 1000 to 5000 parts of the penicillin solution, although in some cases considerably less may be used, for example, the use may be in the ratio of 1:10,000. As stated, it is not important at what stage, after the mold has been removed by filtration or the like, the acylated amino-ether is added to the solution. It may be added before the acid is added to adjust the pH of the penicillin in the usual way, or after the acid is added, or even after the solvent is added. It may be added to either the solvent or the solution. Advantageously it is added to the solution before the solvent is brought into contact with it.

After the separation of the mixture of organic solvent and solution, the solvent is treated to recover the penicillin therefrom and the aqueous liquid is discarded or in some cases, subjected to a second or even a third extraction to insure recovery of as much of the penicillin which it contains as is feasible. These operations are carried out in the usual way, as by treating the solvent with carbon to separate the penicillin therefrom or subjecting it to extraction with aqueous sodium bicarbonate or the like.

The acylated amino-ethers which are used in accordance with the present invention, are, in general, known compounds. They are characterized by having an acyl radical derived from a monocarboxy detergent-forming acid linked to an amino-ether radical by an ester, as distinguished from an amide, linkage. The presence of amide linkages in the compound is not excluded, as long as there is an acyl radical of a detergent-forming acid linked to the amino-ether by an ester linkage. Such acids are monocarboxy acids having at least eight carbon atoms and not more than thirty-two carbon atoms, and included among them are fatty acids, naphthenic acids, abietic acids, or the like, or simple modifications thereof, which combine with alkali to produce soap or soap-like materials. Hydrogenated oleic acid, chlorinated naphthenic acid, and brominated abietic acid are acids of this type as are the oxidized acids obtained by blowing or oxidation of such acids or their esters, such as the acids of blown castor oil, or blown semi-drying oils such as rape seed oil or soya bean oil.

The amino-ethers, which are acylated as described to form the materials used in the practice of the present invention, are derived from a hydroxy amine and a polyhydric alcohol which may itself be a hydroxy amine or may be an alcohol such as a glycol or glycerol or polyglycol, polyglycerol, or the like. The commonest example, of the hydroxy amines which may be used in preparing these compounds are the ethanol amines, particularly diethanol amine and triethanol amine, although other hydroxy amines including monoethanolamine, ethyl ethanolamine, methyl ethanolamine, propanolamine, dipropanolamine, propyl propanolamine, cyclohexanolamine, dicyclohexanolamine, cyclohexyl-ethanolamine, cyclohexylpropanolamine, benzyl ethanolamine, benzyl propanolamine, pentanolamine, hexanolamine, octyl ethanolamine, octadecyl ethanolamine, cyclohexanol ethanolamine, triethanolamine, diethanolalkylamines, such as diethanolethylamine, diethanol propylamine, diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, dibenzyl ethanolamine, benzyl dipropanolamine, tripentanolamine, trihexanolamine, ethyl hexyl ethanolamine, octadecyl diethanolamine, polyethanolamine, mono-, di-, and triglycerylamine, etc. may be used. Such amines form, with polyhydric alcohols, ethers which may have one or more hydroxyl groups, it being necessary that the amino-ether have at least one hydroxyl group permitting acylation with a monocarboxy detergent-forming acid to form an ester. The polyhydric alcohol may itself be a hydroxy amine such as triethanol amine, diethanol amine or other hydroxy amine, or may be a polyhydric alcohol of the type of the glycols and glycerols or the so-called ether alcohols such as diethylene glycol, diglycerol, or higher oxyalkylated glycols such as tetraethylene glycol. Similarly, instead of the simple hydroxy amines listed above, oxyalkylated derivatives thereof, such as those products obtained by treating any of the named hydroxy amines with ethylene oxide, chlorhydrin, epichlorhydrin, propylene oxide, glycide or other oxyalkylated agents are hydroxy amines suitable for use in preparing compounds for the practice of this invention. Of particular importance are the acylated derivatives of the amino ethers obtained from glycerine and triethanolamine.

It is not necessary, in preparing the compounds used in accordance with the invention, that the amino ether be first prepared and then acylated, as by treatment with a monocarboxy detergent-forming acid or a functional equivalent thereof, such as an ester, amide, anhydride or acyl chloride, although that procedure may be followed. Instead, an ester of either the hydroxy amine or the polyhydric alcohol may be formed and that ester reacted with the other component to cause condensation and the formation of an ether reaction product, as in the reaction of the mono fatty acid ester of triethanolamine with glycerol to produce the glycerol ether. Advantageously, the compounds used are prepared by reaction of a fatty material, such as a triglyceride, particularly a triglyceride of a semi-drying oil, with a hydroxy amine, such as triethanolamine, at an elevated temperature for a substantial period of time with the production of a product in which the fatty acid is linked to the final material by an ester linkage, that is, by esterification, and the glycerine radical and the triethanolamine radicals are linked by one or more ether linkages. It will be recognized that such a product may well consist of a relatively complex mixture, although characteristically it can be described as an acylated amino-ether product.

It should also be noted that it is not necessary that the amino-ether be derived from either a polyhydroxyamine or a polyhydric alcohol, as long as one or the other of the materials, after etherification has at least one hydroxyl group available for esterification by the monocarboxy detergent-forming acid. Thus, for example, with polyhydroxy amines such as triethanolamine, the ether linkage may be introduced by etherification of one or two of the hydroxyl groups of the triethanolamine by monohydric alcohols, such as methyl, ethyl, or higher alcohols, ranging up to octadecyl alcohol, which alcohol may be normal or branched. Ethers of this kind are known, and may be, by acylation, converted to compounds useful in practicing the present invention. Similarly, monohydroxyamines such as diethylethanolamine, etherified by a polyhydric alcohol, such as glycerol, may be esterified by a suitable detergent-forming acid to produce compounds useful in practicing the invention.

Similarly, the compounds used may contain more than one acyl radical, such, for example, as two such radicals, as in the case of amino ethers derived by etherifying a residual hydroxyl group of the di-fatty acid ester of triethanolamine. Such compounds are known.

It will also be apparent that with many of the materials which may be used in practicing the present invention, there will be present in the acylated-amino ether residual hydroxyl groups, neither etherified nor esterified in the monomeric form of the compound. Such a material is represented, for example, by the product derived by heating a triglyceride with triethanolamine in the molecular proportions of one mole of oil to three moles of triethanolamine. In the monomeric form, that is, the form in which there is combined one acid radical, one hydroxy amine radical and one glycerol radical, there are four residual hydroxyl groups, unless as may happen, dehydration takes place with the formation of inner anhydrides of the nature of ethanol morpholine derivatives, or glycide derivatives. Such compounds, having free hydroxyl groups, are capable of further etherization, with formation of what may be termed polymeric compounds, and the use of such polymeric compounds is included within the invention. Such compounds, of course, are of the nature of polyamines, that is, they contain more than one nitrogen atom per molecule. In general, it is advantageous that the material does not have more than five nitrogen atoms in the molecule, and most advantageously the compounds used will have two or three nitrogen atoms per molecule.

While a wide range of detergent-forming acids may be used to supply the acyl group or groups in the compounds, the fatty acids, particularly those occurring naturally in the form of triglycerides in oils and fats are advantageously used and because of availability are advantageously used in the form of the naturally occurring triglycerides which are directly reacted with the hydroxyamine to produce the final acylated amino-ethers. Among the glycerides which may be used with advantage are castor oil, olive oil, cotton seed oil, rape seed oil, corn oil, coconut oil, palm and palm kernel oil, linseed oil, sun flower seed oil, tea seed oil and soya bean oil.

In general, it is desirable to use materials which in their monomeric form contain less than 60 carbon atoms and most advantageous to use material which contain less than 25 carbon atoms.

The invention will be illustrated by the following examples but it is not limited thereto.

*Example I.*—900 lbs. of soya bean oil are mixed with 400 lbs. of triethanolamine and heated to 250° C. with agitation, as by passing a current of nitrogen through the reaction mixture. The time of heating may be varied, depending upon the degree of formation of polymeric material desired in the product. For the treatment of a penicillin solution, obtained from a dry culture product, to simplify the separation of the solvent from the solution after extraction, a product heated under the stated conditions for about four hours gives very good results. For use with a broth from vat or bottle culture procedure a product heated under the stated conditions for about ten hours gives very good results. The product is used in proportions of about 1:1000 to 1:5000, based on the metabolic liquor, and as previously stated, may be added to the liquor before or after acidification or after the solvent has been added or even with the solvent but best results seem to follow from the addition of the reagent to the liquor either before or after acidification, but before admixture with the solvent

*Example II.*—Coconut oil and commercial triethanolamine in molar proportions of 1:3 are heated to 160–180° C. for about two hours. To the reaction product are added a little more than two moles of glycerin, and heating is continued for about two days at a temperature between about 160 and 180° C. A current of dry nitrogen or other inert gas may be passed through to speed up the reaction. Condensation occurs with the production of ether reaction products, such as the di-hydroxypropyl ether of the mono fatty acid ester of triethanolamine and other more complex products having ether linkages.

*Example III.*—An equimolar mixture of the monostearic acid ester of glycerin and the mono-acetic acid ester of triethanolamine are heated together for a period of about two days with the production of a product containing substantial amounts of the ether of the mono-acetic acid ester of triethanolamine with the mono-stearic acid ester of glycerin together with more complex ethers.

*Example IV.*—A fatty oil, ethylene glycol and commercial triethanolamine in the molar proportions of 1:1:2 are heated to about 150–180° C. for about two days with the production of a reaction product containing substantial amounts of the ether of the mono-ester of triethanolamine with the corresponding mono-glyceride and the ether of the mono-ester of triethanolamine with the mono-ester of ethylene glycol.

*Example V.*—Triethanolamine and coconut oil in the molar proportions of 3:1 are heated to 150–180° C. for a period of about two days. A current of inert gas, such as dry nitrogen, may be passed through the reaction mixture to speed up the reaction. The resulting product consists largely of the ether formed by the elimination of a molecule of water from two molecules of the mono-fatty acid ester of triethanolamine, with minor proportions of more complex ethers, ethers of the di-fatty acid ester of triethanolamine, ethers of the fatty acid ester of triethanolamine with glycerin or mono- or di-glycerides, etc.

*Example VI.*—The diricinoleic acid ester of triglycerylamine is heated to 150–180° C. for about two days, with the production of a product consisting largely of ethers such as di-dihydroxypropyl mono-hydroxypropylamine diricinoleate ether and more complex ethers formed by the condensation of more than two molecules of the triglycerylamine diricinoleate.

The products of Examples II through VI are used in assisting in the separation of the emulsions formed on extraction of the penicillin or other antibiotics from impure aqueous solutions in the manner described in Example I.

*Example VII.*—Triethanolamine is converted to an oxyethylated product by treatment with from three to four moles of ethylene oxide in the known way. To the resulting ethereal product is added a fatty oil, such as soya bean oil, in the molar proportions of 1:3, and the resulting product is heated to a temperature of 150–180° C. for about two days, resulting in a relatively complex mixture of acylated amino-ethers, including the mono acyl ester of the ether of glycerin with oxyethylated triethanolamine.

The products used in the practice of the invention are basic in nature, and form acid addition salts with mineral or other acids. If desired, they may be used in the form of a salt with any suitable organic or mineral acid, having due regard to the fact that the products are brought into contact with a material eventually intended for therapeutic use. Thus, they may be used as salts with such acids as acetic acid, hydrochloric acid, lactic acid, nitric acid, phosphoric acid, or the like. If used in the form of a salt, the phosphoric acid salt may well be used because phosphoric acid is commonly used in the acidification of the penicillin culture broth. Where reference is made in the appended claims to amines, it is intended to include the amines as free bases as well as in the form of their salts with acids.

While the invention has been described with particular reference to the recovery of penicillin from the impure solutions thereof which are obtained either as culture broths or upon extraction of penicillin from the culture medium as in the dry culture process, it is applicable to the recovery of other antibiotics which are extracted from impure aqueous solutions with the use of water immiscible organic solvents such as streptothricin, streptomicin, tyrotricin, and others.

We claim:

1. In the extraction of penicillin from acidic aqueous solutions thereof with water-immiscible organic solvents, the step of including in the extraction mixture a reaction product formed by heating at a temperature within the range of about 150 to about 250° C. a fatty oil and triethanolamine in molar proportions of about 1:3, the relative proportions of the reaction product and the aqueous solution being within the range from about 1:10,000 to about 1:1,000.

2. A process as in claim 1 in which the fatty oil used in preparing said reaction product is soya bean oil.

3. A process as in claim 1 in which the fatty oil used in preparing said reaction product is coconut oil.

ARTHUR FRANK WIRTEL.
CHARLES M. BLAIR, Jr.

REFERENCES CITED

The following references are of record in the file of this patent:

UNITED STATES PATENTS

| Number | Name | Date |
| --- | --- | --- |
| 2,231,574 | De Groote | Feb. 11, 1941 |
| 2,443,825 | Johnson | June 22, 1948 |
| 2,448,790 | Foster et al. | Sept. 7, 1948 |

OTHER REFERENCES

Whitmore, Penn State College Report, May 2, 1944, published by Office of Production Research and Development, (War Production Board) WPB-126.